(12) United States Patent
Drigo et al.

(10) Patent No.: US 8,030,394 B2
(45) Date of Patent: Oct. 4, 2011

(54) WATERPROOFING MEMBRANES WITH A SPECIFIC GRAVITY OF UNDER 1 G/CM³ BASED ON BITUMEN MODIFIED WITH POLYMERS CONTAINING HOLLOW GLASS MICROSPHERES

(75) Inventors: Michele Drigo, Ponte di Piave (IT); Daniele Pascon, Salgareda (IT)

(73) Assignee: Polyglass S.p.A., Milan (IT)

( * ) Notice: Subject to any disclaimer, the term of this patent is extended or adjusted under 35 U.S.C. 154(b) by 0 days.

(21) Appl. No.: 12/815,544

(22) Filed: Jun. 15, 2010

(65) Prior Publication Data

US 2010/0317773 A1    Dec. 16, 2010

(30) Foreign Application Priority Data

Jun. 16, 2009   (IT) .............................. MI2009A1063

(51) Int. Cl.
*C08K 3/40*    (2006.01)
*C08L 95/00*   (2006.01)

(52) U.S. Cl. ......... 524/494; 524/59; 524/71; 525/331.9; 427/407.1

(58) Field of Classification Search .................. 524/494, 524/59, 71; 525/331.9; 427/407.1
See application file for complete search history.

(56) References Cited

U.S. PATENT DOCUMENTS 4,351,913 A * 9/1982 Patel .............................. 523/218
5,763,014 A * 6/1998 Pickett ........................ 427/430.1

* cited by examiner

*Primary Examiner* — Ling Choi
(74) *Attorney, Agent, or Firm* — Lucas & Mercanti, LLP

(57) ABSTRACT

Disclosed are waterproofing membranes consisting of a backing impregnated with a bituminous formulation comprising industrial bitumen, a mineral filler, a thermoplastic polymer or a mixture of thermoplastic polymers, characterized in that the mineral filler consists of hollow glass microspheres with a density of between 0.10 and 0.14 g/cm³ and a size of less than 120 μm.

11 Claims, No Drawings

WATERPROOFING MEMBRANES WITH A SPECIFIC GRAVITY OF UNDER 1 G/CM³ BASED ON BITUMEN MODIFIED WITH POLYMERS CONTAINING HOLLOW GLASS MICROSPHERES

CROSS-REFERENCE TO RELATED APPLICATIONS

This application claims priority to and benefit of Italian Application No. MI2009A001063 filed on Jun. 16, 2009, the content of which is incorporated herein by reference in its entirety.

FIELD OF THE INVENTION

This invention relates to waterproofing membranes based on bitumen and a mineral filler consisting of hollow glass microspheres.

BACKGROUND OF THE INVENTION

Formulations comprising industrial bitumen, a mineral filler, a thermoplastic polymer or a mixture of thermoplastic polymers have long been proposed for the preparation of waterproofing membranes designed for applications in the construction industry. The mineral filler typical of conventional formulations is calcium carbonate.

For example, US 2006/0110996 describes waterproofing membranes obtained by applying a formulation comprising bitumen, a thermoplastic polymer, calcium carbonate and titanium dioxide to one side of a fibrous material such as fibreglass or a non-woven polyester.

U.S. Pat. No. 4,420,524 discloses similar waterproofing membranes obtained by impregnating a plurality of reinforcing layers consisting of fibreglass and polyester structures with a formulation of bitumen and a thermoplastic polymer, and possibly a mineral filler consisting of various compounds such as slaked lime, talc, clays, diatomaceous earths, cement and the like.

In this specific application sector, the need is particularly felt for bituminous formulations which allow the preparation of waterproofing membranes that are as light as possible without prejudicing the strength and performance of the membrane.

US 2009/061236 discloses a bituminous formulation consisting of an ethylene/alpha-olefin interpolymer which dissolves rapidly in bitumen and presents improved stability to heat and UV rays. The problem of reducing the weight of waterproofing membranes is not dealt with therein.

DE 102006010446 describes bituminous binders for membranes consisting of a mineral filler in the percentage of 10 to 45% consisting of expanded glass spheres with a particle size of between 0.1 and 2.0 mm However, the high percentage of glass spheres and their particle size seem to be incompatible with satisfactory membrane performance in terms of density, weight and waterproofing capacity.

U.S. Pat. No. 6,092,557 describes a pipeline insulated by a bituminous formulation comprising a filler such as glass spheres or cenospheres, wood chips or other fibres. Waterproofing membranes for the construction industry are not described therein.

U.S. Pat. No. 4,168,178 discloses asbestos-free bituminous compositions with the addition of carbon black, also including 10-45% of a particulate filler consisting of glass spheres, perlite, sand or alumina. The technical problem described therein relates to the replacement of asbestos fibres.

US 20070187647 discloses coating materials comprising bitumen, water and thixotropic additives selected from hollow glass spheres, fabrics, and organic or inorganic silicon derivatives. Said materials are used to protect road asphalt or building surfaces against damp, corrosion and/or heat. Waterproofing membranes are not described therein.

EP 782977 discloses a liquid waterproofing formulation consisting of two components: a latex or rubber artificial component and an oily component which can include up to 30% bitumen together with rheological agents such as hollow glass spheres.

None of the documents cited deals with the technical problem of reducing the weight and improving the performance of waterproofing membranes for the construction industry.

DESCRIPTION OF THE INVENTION

It has now been found that a particularly advantageous bituminous formulation can be obtained by replacing the calcium carbonate or equivalent mineral fillers having known formulations with a material consisting of hollow glass microspheres with a density of much less than 1 g/cm³.

The present invention therefore provides waterproofing membranes consisting of a reinforcing material impregnated with a formulation characterised by a specific gravity much lower than that of conventional formulations; this allows the manufacture of membranes which, thickness being equal, are lighter than those manufactured with conventional formulations, with no reduction in the strength or performance of the membrane.

Weight reduction constitutes a major advantage in the application of waterproofing membranes on building sites, as this application is still performed manually.

The formulation according to the invention also enables particularly low specific gravities to be obtained, thus allowing the manufacture of rolls of waterproofing membrane which are manageable on site by a single person and comply with current legislation relating to "manual handling of loads".

The transport of membrane rolls at a height is thus facilitated, and less effort is required for the layer to lay the membrane on the surface to be waterproofed.

The greater flexibility of the membranes obtainable with the formulations according to the invention also means that they adapt better to the surface to be waterproofed, which is rarely perfectly flat.

DETAILED DESCRIPTION OF THE INVENTION

The first aspect of the invention relates to waterproofing membranes consisting of a reinforcing material impregnated with a bituminous formulation comprising industrial bitumen, a mineral filler, a thermoplastic polymer or a mixture of thermoplastic polymers, characterised in that the mineral filler consists of hollow glass microspheres with a density of between 0.10 and 0.14 g/cm³ and a size of less than 120 μm.

The bituminous waterproofing membranes according to the invention are characterised by a specific gravity of under 1 g/cm³.

A further aspect of the invention relates to a process for the preparation of waterproofing membranes which comprises impregnation of a reinforcing material with a formulation such as the one described above. Finally, the invention also relates to the membranes obtainable by said process, belonging to different classes defined by cold bending values measured according to standard EN 1109, in the 0-25° C. range.

The thermoplastic polymer is preferably selected from low-density polyethylene, high-density polyethylene, isotactic polypropylene, ethylene/propylene copolymer, ethylene/propylene/butene terpolymer, atactic polypropylene, and styrene-butadiene-styrene block copolymer.

Industrial bitumen, in particular bitumen 180/200, is generally present in the formulations according to the invention in quantities of between 70% and 80% by weight, while the thermoplastic polymer or polymers are present in quantities of between 15% and 25%.

Hollow glass microspheres with a density of between 0.10 and 0.14 g/cm$^3$ and a size of less than 120 μm are present in quantities of between 2% and 7% by weight, and preferably in quantities of between 3% and 5% by weight.

The reinforcing material impregnated with the formulations according to the invention to prepare the waterproofing membranes is preferably a non-woven polyester.

Hollow glass microspheres with a density of between 0.10 and 0.14 g/cm$^3$ and a size of less than 120 μm are available on the market under the 3M Scotchlite brand.

Bituminous membranes are traditionally classified on the basis of the cold bending parameter, measured according to standard EN 1109, which determines the minimum temperature at which a test specimen of bituminous membrane can be bent around a specific mandrel without cracking.

The three most common classes on the market are Class −5° C., Class −10° C. and Class −15° C. This classification is not included in a specific standard, but has historically been recognised by the market. Typical conventional formulations for each class are listed below:

Class −5° C.

Composition of the formulation, expressed as a % by weight:
  Mixture of high- and low-density polyethylene: 6%;
  Calcium carbonate: 49%;
  Industrial bitumen 180/200: 45%;
  Weight of 4 mm thick membrane: 5.7 kg/m$^2$;
  Weight of 10 m$^2$ roll of membrane: 57 kg.
  Mechanical characteristics of compound:
  Cold bending (EN1109): −5° C.;
  Penetration at 25° C. (EN 1426): 18 dmm;
  Penetration at 60° C. (EN 1426): 80 dmm;
  Softening point (EN1427): 120° C.;
  Viscosity at 180° C. with Brookfield DV-E viscometer, RVOT spindle, 100 rpm: 13000 cps.
  Typical performance characteristics of membrane:
  High-temperature flow resistance (EN 1110): 110° C.;
  Watertightness (EN 1928-B): 100 kPa.

Class −10° C.

Composition of the formulation, expressed as a % by weight:
  Mixture of high- and low-density polyethylene: 8%;
  Calcium carbonate: 38%;
  Industrial bitumen 180/200: 54%;
  Weight of 4 mm thick membrane: 5.2 kg/m$^2$;
  Weight of 10 m$^2$ roll of membrane: 52 kg.
  Mechanical characteristics of compound:
  Cold bending (EN1109): −10° C.;
  Penetration at 25° C. (EN 1426): 18 dmm;
  Penetration at 60° C. (EN 1426): 85 dmm;
  Softening point (EN1427): 120° C.;
  Viscosity at 180° C. with Brookfield DV-E viscometer, RV07 spindle, 100 rpm: 9300 cps.
  Typical performance characteristics of membrane:
  High-temperature flow resistance (EN 1110): 110° C.;
  Watertightness (EN 1928-B): 100 kPa.

Class −20° C.

Composition of the formulation, expressed as a % by weight:
  Mixture of low-density polyethylene and styrene-butadiene-styrene block copolymer: 6%;
  Calcium carbonate: 35%;
  Industrial bitumen 180/200: 59%.
  Weight of 4 mm thick membrane: 5.1 kg/m$^2$.
  Weight of 10 m$^2$ roll of membrane: 51 kg.
  Mechanical characteristics of compound:
  Cold bending (EN1109): −20° C.;
  Penetration at 25° C. (EN 1426): 26 dmm;
  Penetration at 60° C. (EN 1426): 103 dmm;
  Softening point (EN1427): 118° C.;
  Viscosity at 180° C. with Brookfield DV-E viscometer, RV07 spindle, 100 rpm: 9200 cps.
  Typical performance characteristics of membrane:
  High-temperature flow resistance (EN 1110): 100° C.;
  Watertightness (EN 1928-B): 100 kPa.

The distinguishing characteristics of the new formulation, compared with the conventional formulation suitable for the manufacture of a membrane in the same class, can be summarised as follows:
  Total absence of calcium carbonate.
  Mineral filler consisting of hollow glass microspheres with a density of between 0.10 and 0.14 g/cm$^3$ and a size of less than 120 μm.
  Higher softening point.
  Higher flow resistance.

The invention will be described in greater detail in the following Examples.

EXAMPLE 1

Class −5 Membrane

The following substances are introduced into a 10 m$^3$ mixer:
  Ethylene/propylene copolymer: 1100 kg;
  Isotactic polypropylene: 400 kg;
  Mineral filler consisting of hollow glass microspheres with a density of between 0.10 and 0.14 g/cm$^3$ and a size of less than 120 μm: 300 kg;
  Industrial bitumen 180/200: 5900 kg.

The composition of the formulation, expressed as a % by weight, is:
  Mixture of ethylene/propylene copolymer and isotactic polypropylene: 19.5%;
  Mineral filler: 3.9%;
  Industrial bitumen 180/200: 76.6%.
  Mechanical characteristics of compound:
  Cold bending (EN1109): −5° C.;
  Penetration at 25° C. (EN 1426): 21 dmm;
  Penetration at 60° C. (EN 1426): 78 dmm;
  Softening point (EN1427): 157° C.;
  Viscosity at 180° C. with Brookfield DV-E viscometer, RV07 spindle, 100 rpm: 14000 cps.

When the compound thus obtained is used on a wholly conventional membrane production line, a membrane with the following characteristics is produced:
  Weight of 4 mm thick membrane: 3.0 kg/m$^2$;
  Weight of 10 m2 roll of membrane: 30 kg.
  Performance characteristics of membrane:
  Flow resistance at high temperature (EN 1110): 130° C.;
  Watertightness (EN 1928-B): 100 kPa.

EXAMPLE 2

Class −10 Membrane

The following substances are introduced into a 10 m³ mixer:
  Ethylene/propylene copolymer: 1400 kg;
  Isotactic polypropylene: 200 kg;
  Mineral filler consisting of hollow glass microspheres with a density of between 0.10 and 0.14 g/cm³ and a size of less than 120 μm: 300 kg;
  Industrial bitumen 180/200: 5822 kg.

The composition of the formulation, expressed as a % by weight, is:
  Mixture of isotactic polypropylene, ethylene/propylene copolymer: 20.7%;
  Mineral filler: 3.9%;
  Industrial bitumen 180/200: 75.4%.
  Mechanical characteristics of compound:
  Cold bending (EN1109): −10° C.;
  Penetration at 25° C. (EN 1426): 27 dmm;
  Penetration at 60° C. (EN 1426): 107 dmm;
  Softening point (EN1427): 154° C.;
  Viscosity at 180° C. with Brookfield DV-E viscometer, RV07 spindle, 100 rpm: 12900 cps.

When the compound thus obtained is used on a wholly conventional membrane production line, a membrane with the following characteristics is produced:
  Weight of 4 mm thick membrane: 3.0 kg/m²;
  Weight of 10 m² roll of membrane: 30 kg.
  Performance characteristics of membrane:
  High-temperature flow resistance (EN 1110): 140° C.
  Watertightness (EN 1928-B): 100 kPa.

EXAMPLE 3

Class −20 Membrane

The following substances are introduced into a 10 m³ mixer:
  Mixture of low-density polyethylene and styrene-butadiene-styrene block copolymer: 1000 kg;
  Mineral filler consisting of hollow glass microspheres with a density of between 0.10 and 0.14 g/cm³ and a size of less than 120 μm: 300 kg;
  Industrial bitumen 180/200: 6489 kg.

The composition of the formulation, expressed as a % by weight, is:
  Mixture of low-density polyethylene and styrene-butadiene-styrene block copolymer: 12.8%;
  Mineral filler: 3.9%;
  Industrial bitumen 180/200: 83.3%.
  Mechanical characteristics of compound:
  Cold bending (EN1109): −25° C.;
  Penetration at 25° C. (EN 1426): 32 dmm;
  Penetration at 60° C. (EN 1426): 88 dmm;
  Softening point (EN1427): 135° C.;
  Viscosity at 180° C. with Brookfield DV-E viscometer, RV07 spindle, 100 rpm: 16620 cps.

When the compound thus obtained is used on a wholly conventional membrane production line, a membrane with the following characteristics is produced:
  Weight of 4 mm thick membrane: 3.0 kg/m²;
  Weight of 10 m² roll of membrane: 30 kg.
  Performance characteristics of membrane:
  High-temperature flow resistance (EN 1110): 120° C.;
  Waterproofing (EN 1928-B): 100 kPa.

The invention claimed is:

1. Waterproofing membranes consisting of a reinforcing material impregnated with a bituminous formulation comprising industrial bitumen, a mineral filler, a thermoplastic polymer or a mixture of thermoplastic polymers, wherein the mineral filler consists of hollow glass microspheres with a density of between 0.10 and 0.14 g/cm³ and a size of less than 120 μm.

2. Waterproofing membranes as claimed in claim 1, wherein the thermoplastic polymer is selected from low-density polyethylene, high-density polyethylene, isotactic polypropylene, ethylene/propylene copolymer, ethylene/propylene/butene terpolymer, atactic polypropylene, and styrene-butadiene-styrene block copolymer.

3. Waterproofing membranes as claimed in claim 1, wherein the industrial bitumen is present in quantities of between 70% and 80% by weight.

4. Waterproofing membranes as claimed in claim 1, wherein the thermoplastic polymer or polymers are present in quantities of between 15% and 25%.

5. Waterproofing membranes as claimed in claim 1, wherein the mineral filler is present in quantities of between 2% and 7% by weight.

6. Waterproofing membranes of claim 5, wherein the mineral filler is present in quantities of between 3% and 5% by weight.

7. Waterproofing membranes as claimed in claim 1, characterized by a specific gravity of under 1 g/cm³.

8. Process for the preparation of waterproofing membranes belonging to different classes defined by cold bending values, measured according to standard EN 1109, in the 0-25° C. range, said method comprising: impregnating a reinforcing material with a bituminous formulation comprising industrial bitumen, a mineral filler consisting of hollow glass microspheres with a density of between 0.10 and 0.14 g/cm³ and a size of less than 120 μm, and a thermoplastic polymer or a mixture of thermoplastic polymers.

9. Process as claimed in claim 8, wherein the reinforcing material is a non-woven polyester.

10. Waterproofing membranes obtained by the process claimed in claim 8.

11. A bituminous formulation for the preparation of waterproofing membranes which comprises industrial bitumen, a mineral filler consisting of hollow glass microspheres with a density of between 0.10 and 0.14 g/cm³ and a size of less than 120 μm, and a thermoplastic polymer or a mixture of thermoplastic polymers.

* * * * *